United States Patent [19]
Clark

[11] 3,825,095
[45] July 23, 1974

[54] AERIAL SCAFFOLD FOR VEHICLE

[75] Inventor: Albert L. Clark, West Bend, Wis.

[73] Assignee: Pac-Craft Products, Inc., West Bend, Wis.

[22] Filed: Oct. 10, 1972

[21] Appl. No.: 296,383

[52] U.S. Cl............................ 182/17, 182/2, 182/63, 280/150.5
[51] Int. Cl.............................................. E04g 1/24
[58] Field of Search......... 182/17, 2, 63; 280/150.5, 280/6 H

[56] References Cited
UNITED STATES PATENTS

| | | | |
|---|---|---|---|
| 2,555,336 | 6/1951 | Hagely | 280/150.5 |
| 3,063,667 | 11/1962 | Doty | 280/150.5 |
| 3,452,837 | 7/1969 | Herrell | 182/17 |

Primary Examiner—Reinaldo P. Machado
Attorney, Agent, or Firm—Henry C. Fuller

[57] ABSTRACT

A vertically movable aerial scaffold which is mountable and demountable on the bed of a pick-up truck includes stabilizer bars telescopically received in channel members connected to the frame of the scaffold. The stabilizer bars include jack posts pivotally mounted to the bars for movement from an erected position for use to a collapsed storage position. The scaffold also includes a rear railing or guard with hinged side gates which can be folded against the rear gate when the platform is stored vertically during transportation of the vehicle. Other features include a hinged front safety gate, collapsible steps and a centrally located sleeve in the platform adapted to receive a column which forms part of a boom or a laterally extending access ramp.

2 Claims, 10 Drawing Figures

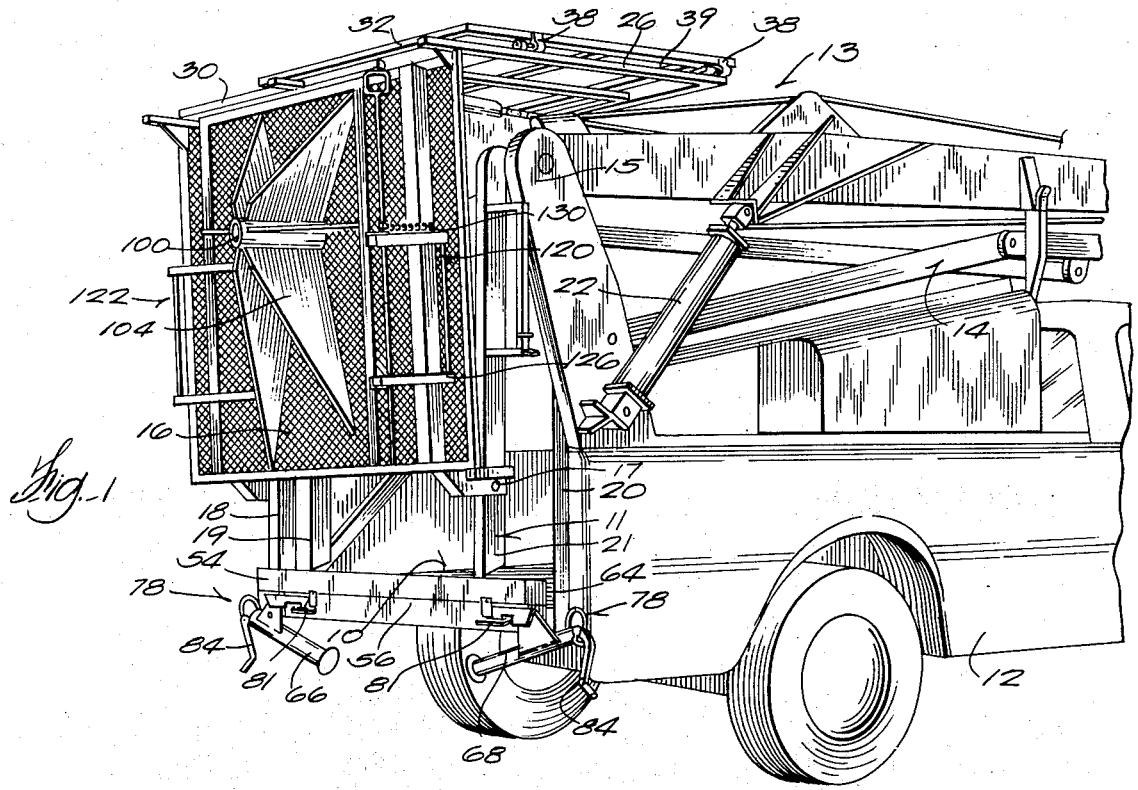
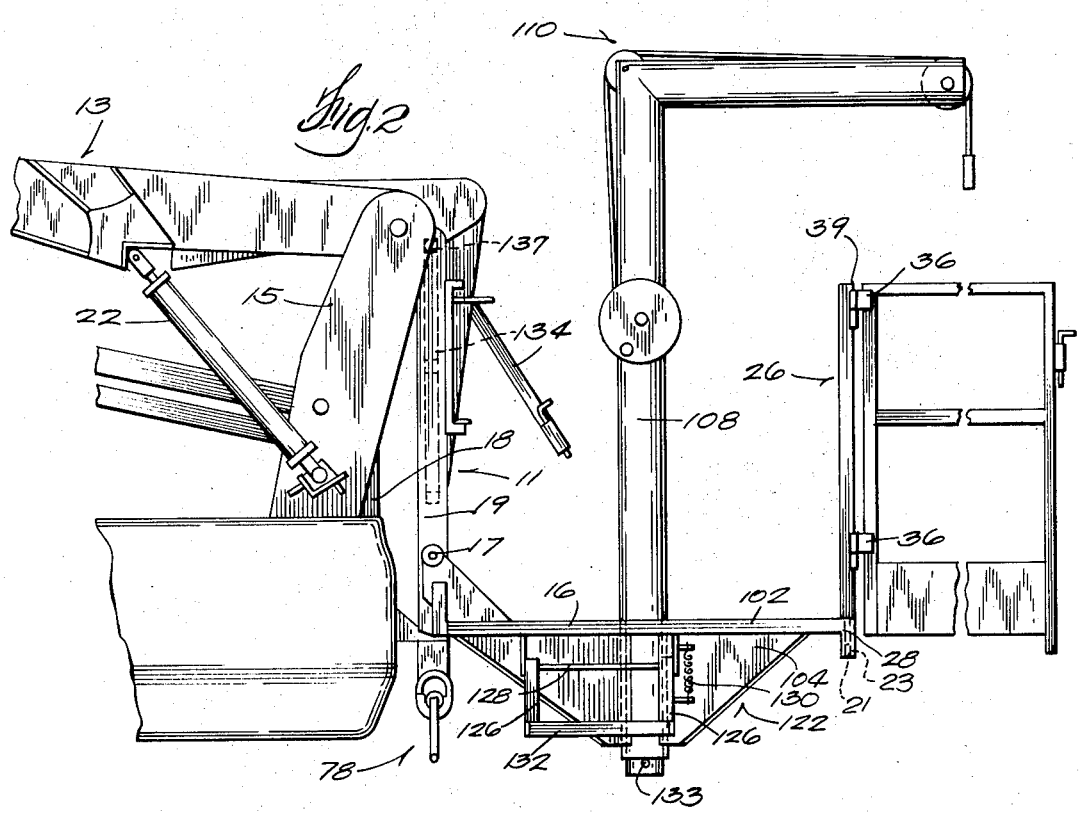

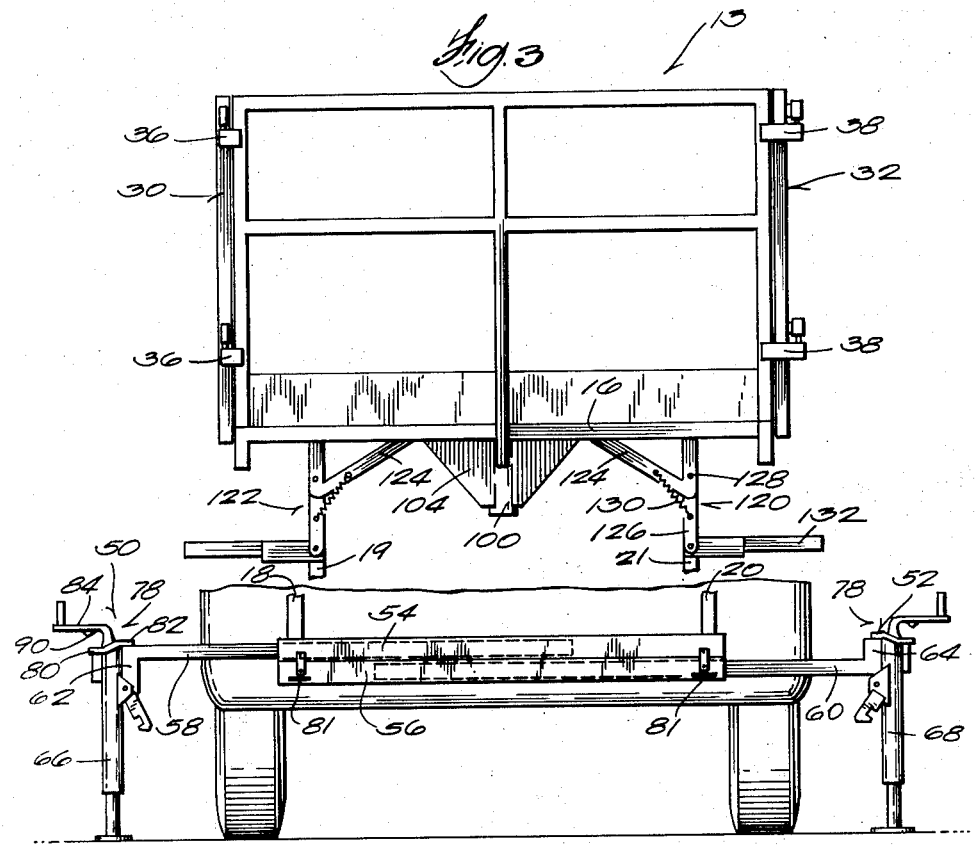

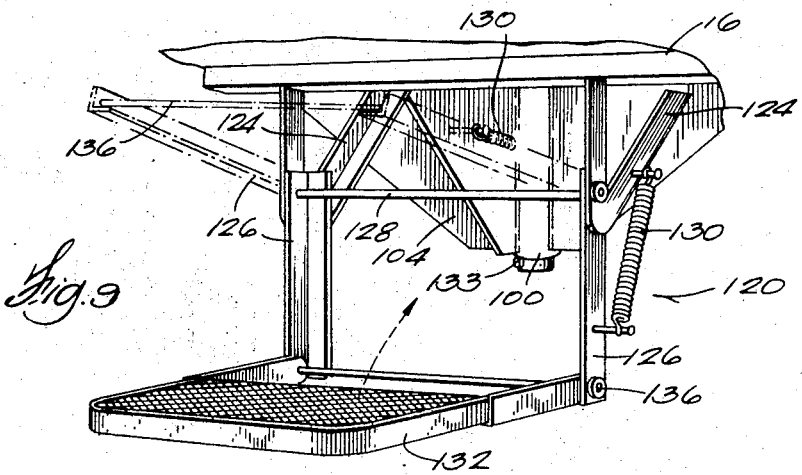
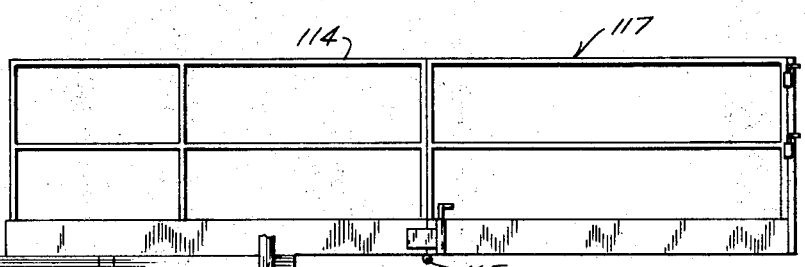
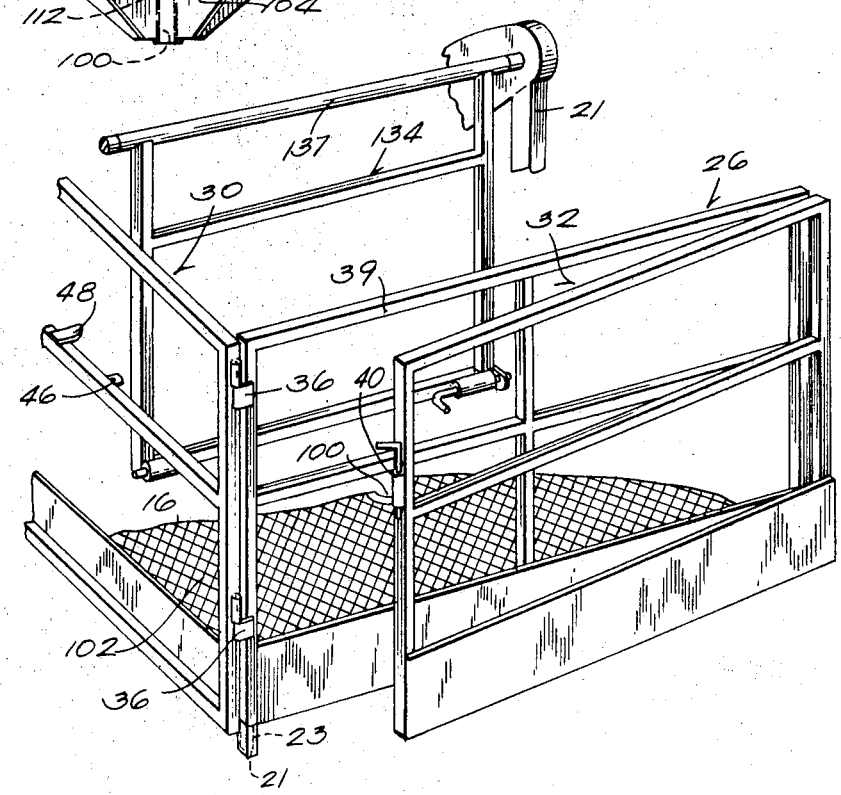

3,825,095

AERIAL SCAFFOLD FOR VEHICLE

BACKGROUND OF INVENTION

The invention relates to improvements to the aerial platform disclosed in my prior application Ser. No. 147,396.

SUMMARY OF INVENTION

The invention provides various improvements for use with a truck mounted scaffold having a personnel platform which is hinged to the scaffold frame for movement between a horizontal position in use to a vertical folded position during travel of the vehicle. The platform is provided with an upstanding rear rail or guard assembly which is fixed to the platform, and opposed side gates which enclose the sides of the platform during use. The side gates are hinged to the rear guard assembly to afford movement from a position enclosing the sides of the platform to a folded superposed position rearwardly of the rear guard assembly. Latches on the side gates secure the gates in the side enclosing position, and secure the gates to each other when in the folded position to prevent movement of the gates during travel of the vehicle or when using a lateral access ramp.

The invention also includes a stabilizer bar assembly to provide lateral support to the vehicle and scaffold when the platform is in use. Upper and lower channel members fixed to each other and to the frame of the scaffold telescopically receive stabilizer bars which are provided at their ends with pivotally mounted jack posts movable from an erect position for use to a folded storage position beneath the channels. Spring biased locking plates maintain the jack posts in the erect position for use, and projections on the jack post handles are employed to disengage the locking plates to fold the jack posts.

Other features include a centrally located sleeve on the platform which is rigidly supported and adapted to receive either a column for a boom or a column for a laterally extending access ramp or platform extension.

Further objects and advantages of the invention will become apparent from the following disclosure.

DRAWINGS

FIG. 1 is a fragmentary side and rear perspective view of a vehicle and the aerial scaffold embodying the scaffold platform with the improvements of the invention.

FIG. 2 is a fragmentary side elevational view of parts of the vehicle and parts of the aerial platform, and showing a boom supported on the platform.

FIG. 3 is a fragmentary rear view with the platform broken away and raised from other parts of the scaffold frame.

FIG. 4 is an enlarged fragmentary view of the stabilizer assembly shown in FIG. 3.

FIG. 5 is an enlarged plan view of parts of the stabilizer assembly shown in FIG. 3.

FIG. 6 is an enlarged fragmentary perspective view of the lock for the side gates showing the side gates folded over the rear of the rear railing.

FIG. 7 is a plan view on reduced scale of a platform extension.

FIG. 8 is an enlarged side elevational view of the platform and lateral access ramp shown in FIG. 7.

FIG. 9 is a fragmentary perspective view of the platform and full perspective view of the step shown in FIG. 3.

FIG. 10 is a fragmentary rear perspective view of the platform, rear guard assembly and folding side guards shown in FIGS. 1 and 3.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows the bed 10 of a pick-up truck 12 with an aerial scaffold 13 which is removably mounted on the bed 10. The aerial scaffold includes a frame 11 and linkage 14 as described in my prior application U.S. Ser. No. 147,396. The frame 11 includes a pair of spaced linkage support members 15. A personnel platform 16 is pivotally connected by pins 17 to upstanding vertical frame members 19 and 21.

In FIG. 1, the platform 16 is shown in a folded, generally vertical position which is employed during travel of the vehicle and when the scaffold is not in use. FIG. 2 shows the platform in the horizontal unfolded position. The platform is maintained in the horizontal position when it is elevated by actuation of hydraulic cylinders 22. The unfolded position shown in FIG. 2 is the lowermost position of the platform 16.

In accordance with the invention, the platform 16 is provided with an upstanding rear rail or guard assembly 26 which is detachably connected at 28 to the platform 16 by projections 23 on the rear rail 16 which interfit in channel members 21 (FIG. 2) on the platform 16. The size of the platform 16 is such that the rear guard assembly 26 can be folded above the linkage and linkage support members 15 (FIG. 1). The invention provides a pair of side gates 30 and 32 (FIGS. 1, 3 and 10) which extend along the sides of the platform during use to prevent a fall or loss of materials or personnel carried by the platform 16.

Means are provided for pivotally connecting the side gates 30 and 32 to the rear gate 26 to afford movement from the side enclosing position (gate 30 in FIG. 10) to a folded overlapping position (gate 32 in FIG. 10) and as shown in FIG. 1. In the disclosed construction, the means comprises hinges 36 and 38 fixed to the rear surface 39 and rear guard assembly 26, and pivotally connected to the respective side gates to afford movement of the side gates over the rear guard or railing 26. Each of the side gates includes a latch 40 in the form of a spring loaded plunger 42 (FIG. 6) in which the plunger 42 engages and registers with an aperture in the frame to maintain the gates in the locked position enclosing the sides of the platform during use.

In FIG. 6, the side gate 32 is folded over the side gate 30 as in the direction shown in FIG. 1, with the latch plunger 42 engaged with an aperture 44 in a tab 46 extending from the side gate 30. A guiding tab 48 located on the side gate 30 assists in registering the plunger in the aperture and maintaining the plunger in locked registery. In folding the gates for storage in the FIG. 1 position, the gate 30 is pivoted over the rear 39 of the rear gate 26 and the side gate 32 is subsequently superposed on the side gate 30.

The aerial scaffold of the invention also includes two stabilizing bar assemblies 50 and 52 (FIG. 3) to provide lateral support to the scaffold 13 and vehicle during use of the aerial platform. The stabilizing bar assemblies include upper and lower channel members 54 and 56 (FIGS. 1 and 3) connected to the scaffold frame portions 18 and 20. The channel members 54 and 56 have a rectangular cross section and telescopically receive stabilizer bars 58 and 60 which have a complimentary cross section. The use of two channel members 54 and 56 with one vertically above the other enables the use of longer stabilizer bars, than if both bars 58 and 60 were received in the same channel, thus affording increased lateral extension and improved lateral support. The stabilizer bar 58 has a down-turned extension 62 and the stabilizer bar 60 has an upward turned extension 64 to compensate for the height difference of the channel members and position the jack posts 66 and 68 at the same vertical height.

In accordance with the invention, means are provided for pivotally connecting the jack posts to the stabilizer bars to afford movement between an erect position for use at right angles to the stabilizer bars and a folded position for storage. In the disclosed construction, the means includes spaced projecting flanges 70 fixed to sleeves 74 (FIG. 4) and pivot pins 76 which extend through the flanges and extensions 62 and 64 of the stabilizer bars. The means also includes locking rings 78 which includes two offset loop portions 80 and 82. The jack post crank 84 is pivotally connected above the locking ring to the jack screw (not shown) fixed within the jack post. The loop portion 82 is adapted to engage a projection 86 (FIGS. 4 and 5) to maintain the jack post in the erect position shown in FIG. 3. In this regard, biasing means in the form of a spring biased plunger 88 carried by a pipe 89 welded to sleeve 74 urges the ring 78 into engagement with projection 86. The locking ring is disengaged from the projection 86 by an ear 90 on the crank arm which depresses the spring biased plunger as shown in FIG. 4 when the crank is pivoted to thus permit the jack post to pivot about pin 76 to the folded position shown in FIG. 1.

The jack posts are retained in the folded position by hooks 77 (FIG. 4) welded to flanges 70. When the stabilizer bars 58, 60 are telescoped into the channel members 54, 56, the hooks 77 are pivoted into engagement with the loops 81 (FIG. 1) which are fixed to the channel members. A stop plate 141 fixed to sleeve 74 (FIGS. 4, 5) holds the ring 78 in place.

The platform 16 also includes a sleeve or pipe 100 which is open to the top 102 of the platform and reinforced by gussets or braces 104 arranged radially about the sleeve and secured to the undersurface of the platform 16. The sleeve 100 is adapted to telescopically receive the column portion 108 of a boom 110 as shown in FIG. 2. The boom 110 is employed in use to raise work materials up to the platform 16 when the platform is in an elevated position. The boom 110 can also be used to raise and level a lamp post or the like. Alternatively, the sleeve 100 can receive a downwardly projecting column 112 on a platform extension or lateral access ramp 114 which is easily attached and detached to the platform by insertion of the post 112 in the sleeve 100. A bolt or cross pin 133 in the column 112 beneath the sleeve 100 secures the ramp 114 in place during use. The ramp 114 can be rotated 180 degrees about the sleeve 100. The ramp 114 enables the workman to reach objects, such as street lights when double parking the vehicle. The ramp can also be used to raise building materials, such as siding. The ramp 114 can be constructed in two hinged sections with a hinge at 115 to enable the platform to be folded for storage in the bed of the truck. The guard rails 117 are removed prior to folding. When using the lateral access ramp, the rear rail assembly 26 and the side gates 30, 32 are removed.

The aerial platform of the invention also includes foldable step assemblies 120 and 122 (FIGS. 3 and 9) which project beneath the sides of the aerial platform 16. In FIG. 3, the steps are shown in the position for use and in FIG. 1, they are shown collapsed beneath the platform 16. Each step assembly includes a pair of spaced brackets 124 connected to the platform 16, and a pair of spaced swing arms 126 which are pivotally connected to the brackets 124 by rods 128. The step portions 132 are hinged to the swing arms by pins 136. Springs 130 are connected to the brackets 124 and swing arms 126 to provide an over-center action which holds the step portions 132 rigid in either the erect or collapsed position. In the unfolded position shown in FIG. 9, the spring holds the swing arms against the brackets 124. To fold the steps from the position shown in FIG. 3 and solid lines in FIG. 9, the step portions 132 are folded against the swing arms 126 and rods 128, and the steps are then pivoted about the rods 128 and folded parallel to the platform 16.

To prevent personnel or materials from falling off the front of the platform, the frame 11 includes a guard 134 (FIG. 2) which has a cross member 136 rotatably supported between the linkage supporting members 15 and pivotally connected to vertical members 19 and 21. The guard 134 is movable from the closed dotted line position shown in FIG. 2 to a pivoted position overlapping the uppermost frame portions to permit access to materials or tools carried in the truck.

What is claimed is:

1. In a vertically movable aerial scaffold which is mountable and demountable in the bed of a vehicle and which includes frame portions located adjacent the rear of the vehicle, the improvement comprising upper and lower guide channel members connected to said rear frame portions and located exteriorly of the vehicle and extending transversely of the longitudinal axis of the vehicle, stabilizer bars telescoped in each of said channels and movable from a collapsed storage position within the outline of the vehicle to an extended position laterally outwardly of the vehicle, jack posts for each of said stabilizer bars and means for connecting said jack posts to said bars to afford movement of said jack posts from a folded storage position beneath said bars to an erect operative position at right angles with said bars and wherein one of said stabilizer bars has an upwardly extending portion, the other of said bars has a downwardly extending portion and wherein said jack posts have sleeves pivotally connected to said upwardly and downwardly extending portions and said means includes a locking plate for maintaining said jack posts in an erect operative position, and means for biasing said locking plate into engagement with projections on said stabilizer bars.

2. The improvement of claim 1 wherein said jack posts have cranks pivotally connected to jack screws and projections on said cranks for compressing said biasing means to release said locking plates and permit movement of said jack posts from the erect position to the folded storage position.

* * * * *